United States Patent
Kim et al.

(10) Patent No.: US 10,432,889 B2
(45) Date of Patent: Oct. 1, 2019

(54) AUDIO-VISUAL SYSTEM AND METHOD FOR CONTROLLING THE SAME

(71) Applicant: SAMSUNG ELECTRONICS CO., LTD., Suwon-si, Gyeonggi-do (KR)

(72) Inventors: Ha-na Kim, Suwon-si (KR); Jee-hoon Park, Seongnam-si (KR); Hyun-yong Choi, Suwon-si (KR); You-na Choo, Seongnam-si (KR); Soo-hyun Whang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/263,823

(22) Filed: Jan. 31, 2019

(65) Prior Publication Data

US 2019/0166327 A1 May 30, 2019

Related U.S. Application Data

(63) Continuation of application No. 16/000,403, filed on Jun. 5, 2018, which is a continuation of application
(Continued)

(30) Foreign Application Priority Data

Mar. 18, 2016 (KR) ........................ 10-2016-0032824

(51) Int. Cl.
*H04N 5/655* (2006.01)
*H04N 5/645* (2006.01)
(Continued)

(52) U.S. Cl.
CPC .............. *H04N 5/655* (2013.01); *H04N 5/60* (2013.01); *H04N 5/642* (2013.01); *H04N 5/645* (2013.01);
(Continued)

(58) Field of Classification Search
CPC .......... H04N 5/655; H04N 5/60; H04N 5/642; H04R 1/028; H04R 1/023; H04R 1/026; H04R 2499/15
See application file for complete search history.

(56) References Cited

U.S. PATENT DOCUMENTS 9,473,839 B2 10/2016 Yu
9,655,267 B2 5/2017 Cope et al.
(Continued)

FOREIGN PATENT DOCUMENTS

AU 2010247552 B2 11/2010
KR 10-2012-0023776 A 3/2012
(Continued)

OTHER PUBLICATIONS

Notice of Allowance issued in U.S. Appl. No. 15/278,981 dated Apr. 5, 2018.

*Primary Examiner* — Huy T Nguyen
(74) *Attorney, Agent, or Firm* — Sughrue Mion, PLLC

(57) ABSTRACT

An audio-visual system may include a housing comprising an open upper end and a storage space, an audio-visual device installed inside the housing and exposable through the open upper end, and a lifting device configured to expose or store the audio-visual device inside the housing through the open upper end. The audio-visual device may include a display, a speaker, and a processor configured to control the audio-visual system to operate in a first mode for outputting media art content while the display is stored in the housing according to a first event, operate in a second mode for outputting audio content through the speaker while part of the display is exposed through the open upper end according to a second event, and operate in a third mode for outputting a visual content while the entire display is exposed through the open upper end according to a third event.

7 Claims, 14 Drawing Sheets

Related U.S. Application Data

No. 15/278,981, filed on Sep. 28, 2016, now Pat. No. 10,015,435.

(60) Provisional application No. 62/269,352, filed on Dec. 18, 2015.

(51) Int. Cl.
*H04R 1/02* (2006.01)
*H04N 5/60* (2006.01)
*H04N 5/64* (2006.01)

(52) U.S. Cl.
CPC ............ *H04R 1/028* (2013.01); *H04R 1/023* (2013.01); *H04R 1/026* (2013.01); *H04R 2499/15* (2013.01)

(56) References Cited

U.S. PATENT DOCUMENTS

| | | | |
|---|---|---|---|
| 10,015,435 B2 * | 7/2018 | Kim | ............ H04N 5/655 |
| 2014/0232615 A1 | 8/2014 | Acosta et al. | |
| 2014/0380186 A1 | 12/2014 | Kim et al. | |

FOREIGN PATENT DOCUMENTS

| | | |
|---|---|---|
| KR | 10-2014-0002052 A | 1/2014 |
| KR | 10-2014-0100149 A | 8/2014 |
| KR | 10-2014-0147497 A | 12/2014 |
| KR | 10-2015-0030433 A | 3/2015 |
| KR | 10-2015-0041451 A | 4/2015 |
| KR | 10-2015-0081394 A | 7/2015 |
| KR | 10-2015-0094478 A | 8/2015 |
| WO | 2014/200151 A1 | 12/2014 |

* cited by examiner

1000

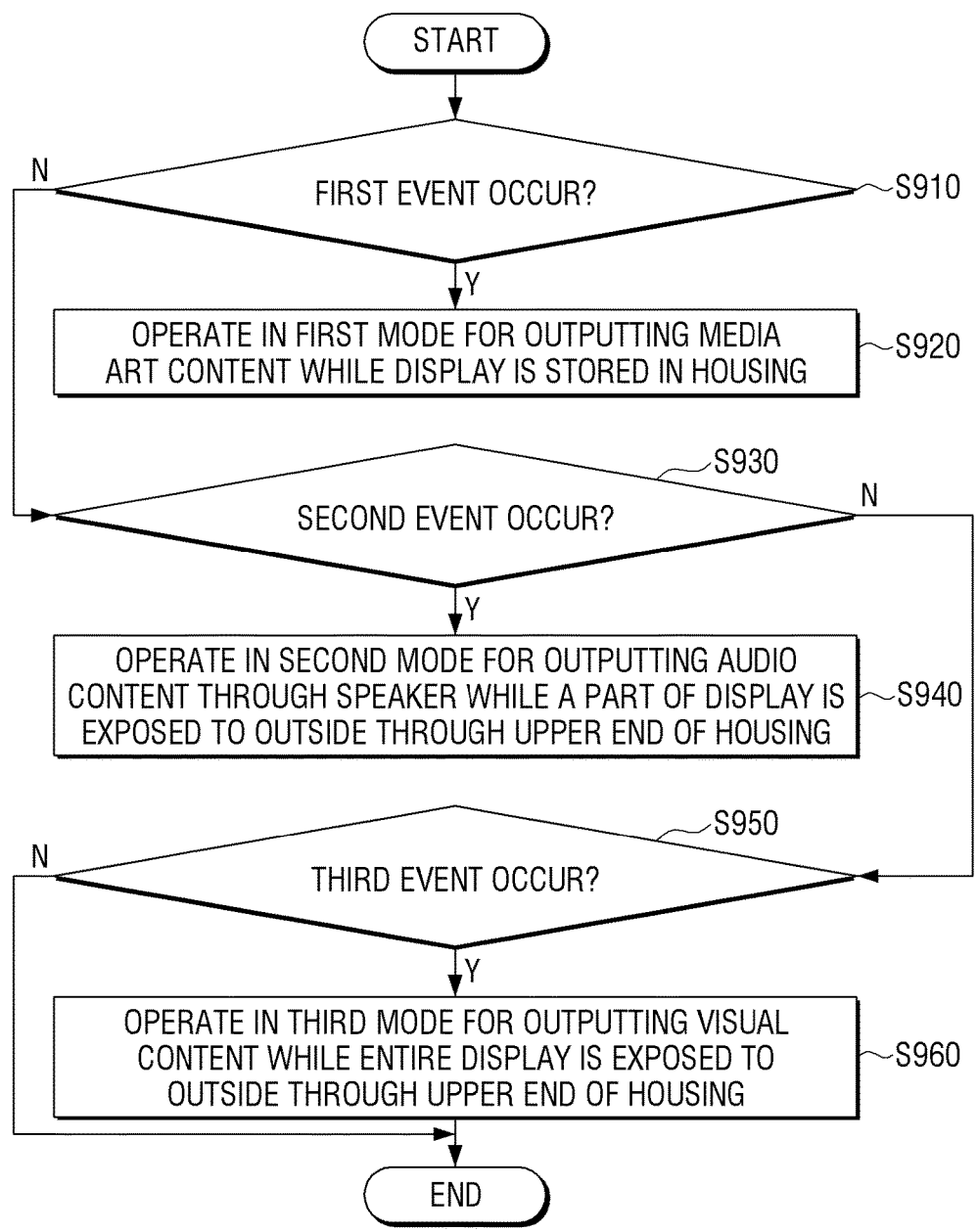

AUDIO-VISUAL SYSTEM AND METHOD FOR CONTROLLING THE SAME

CROSS-REFERENCE TO RELATED APPLICATIONS

This is a continuation of U.S. application Ser. No. 16/000,403 filed on Jun. 5, 2018, which is a continuation of U.S. application Ser. No. 15/278,981 filed on Sep. 28, 2016, now U.S. Pat. No. 10,015,435 issued on Jul. 3, 2018, which claims the benefit of U.S. Provisional Application No. 62/269,352, filed on Dec. 18, 2015 in the United States Patent and Trademark Office, and priority from the Korean Patent Application No. 10-2016-0032824, filed on Mar. 18, 2016 in the Korean Intellectual Property Office, the disclosures of which are herein incorporated by reference in their entireties.

BACKGROUND

1. Field

Systems, apparatuses and methods consistent with exemplary embodiments generally relate to an audio-visual system and a method for controlling the same, and more particularly, to an audio-visual system which provides various content output modes and a method for controlling the same.

2. Description of the Related Art

With the development of electronic technologies, diverse types of electronic devices have been developed and have come into wide use. Specifically, visual devices and audio devices which are widely used in many households, such as, a television (TV), a stereo system, or the like, have been developed continuously in recent years.

With the advance of the performance of the visual devices and audio devices, visual content and audio content is output in an optimal state according to the characteristics of the contents.

However, in order to set up an optimal image-viewing environment or sound-listening environment, each household needs to be equipped with a visual device and an audio device separately. Further, the conventional visual devices and audio devices have been recognized as only an electronic device irrelevant to a home interior decoration, although the visual devices and audio devices have great importance in the home interior decoration actually.

SUMMARY

Exemplary embodiments provide an audio-visual system which features output modes optimized for respective content types and functions not as only an electronic device but as furniture for the interior decoration.

According to an aspect of an exemplary embodiment, there is provided an audio-visual system. The audio-visual system may include a housing comprising an open upper end and a storage space inside the housing, an audio-visual device configured to be installed inside the housing and exposable through the open upper end of the housing, and a lifting device configured to expose the audio-visual device or store the audio-visual device inside the housing through the open upper end of the housing. The audio-visual device may include a display, a speaker installed on at least one side of the display, and a processor configured to control the audio-visual system to operate in a first mode for outputting media art content while the display is stored in the housing according to a first event, operate in a second mode for outputting audio content through the speaker while a part of the display is exposed to an outside through the open upper end of the housing according to a second event, and operate in a third mode for outputting visual content while the entire display is exposed to the outside through the open upper end of the housing according to a third event.

The lifting device may include a lifting unit installed on a lower part of the display so as to make the display protrude from the open upper end of the housing and a driving unit configured to drive the lifting unit. The processor may be configured to, in response to a mode being determined according to an event, control a driving status of the driving unit such that the display protrudes from or is stored in the housing in a state corresponding to the determined mode.

The processor may be configured to, in response to a mode being determined according to an event, perform local dimming to at least a part of a screen area of the display based on a size of content output in the determined mode. In addition, the processor may further include a source device and a communication unit. The processor may be configured to, in response to a mode being determined according to an event, control the communication unit to automatically communicate with the source device providing content which is outputtable in the determined mode.

The processor may be configured to, in response to a mode being determined according to an event, activate at least one speaker corresponding to sound output in the determined mode and perform equalization for the sound.

The processor may provide a user interface (UI) where information related to the audio content is reconstructed based on a size of the part of the display exposed in the second mode, through the exposed part of the display.

The first event may be an event where the media art content is selected, the second event may be an event where the audio content is selected, and the third event may be an event where the visual content is selected.

The housing may include a front surface where a plurality of holes are formed with a predetermined distance therebetween.

The audio-visual device may further include a sensor configured to sense an accessory attached by means of the plurality of holes. The processor may control the display to display the media art content in a display area corresponding to a position where the accessory is not attached, based on a sensing result of the sensor, in the first mode.

According to an aspect of another embodiment, there is provided a method for controlling an audio-visual system including a housing comprising an open upper end and a storage space inside the housing, an audio-visual device configured to be installed inside the housing and exposable through the open upper end of the housing, and a lifting device configured to expose the audio-visual device or store the audio-visual device inside the housing through the open upper end of the housing. The method includes determining a type of an occurred event of the audio-visual device and operating the audio-visual system in a first mode for outputting media art content while a display of the audio-visual device is stored in the housing in response to the occurred event being a first event, operating the audio-visual system in a second mode for outputting audio content through a speaker of the audio-visual device while a part of the display is exposed to an outside through the open upper end of the housing in response to the occurred event being a second event, and operating the audio-visual system in a third mode for outputting visual content while the entire display is exposed to the outside through the open upper end of the housing in response to the occurred event being a third event.

The lifting device may include a lifting unit installed on a lower part of the display so as to make the display protrude from the open upper end of the housing and a driving unit configured to drive the lifting unit. In response to a mode being determined according to an event, controlling a driving status of the driving unit such that the display protrudes from or is stored in the housing in a state corresponding to the determined mode.

In response to a mode being determined according to an event, the method may further include performing local dimming to at least a part of a screen area of the display based on a size of content output in the determined mode.

In response to a mode being determined according to an event, the method may further include automatically communicating with a source device providing a content which is outputtable in the determined mode.

In response to a mode being determined according to an event, the method may further include activating at least one speaker corresponding to sound output in the determined mode and performing equalization for the sound.

The method may further include providing a UI where information related to the audio content is reconstructed based on a size of the part of the display exposed in the second mode, through the exposed part of the display.

The first event may be an event where the media art content is selected, the second event may be an event where the audio content is selected, and the third event may be an event where the visual content is selected.

The housing may include a front surface where a plurality of holes are formed with a predetermined distance therebetween.

The method may further include sensing an accessory attached by means of the plurality of holes and displaying the media art content in a display area corresponding to a position where the accessory is not attached, based on a sensing result, in the first mode.

BRIEF DESCRIPTION OF DRAWINGS

The above and/or other aspects will be more apparent by describing certain exemplary embodiments with reference to the accompanying drawings, in which:

FIG. 9 is a flowchart provided to describe a method for controlling an audio-visual system, according to an exemplary embodiment.

DETAILED DESCRIPTION OF EXEMPLARY EMBODIMENTS

Figure 1A:
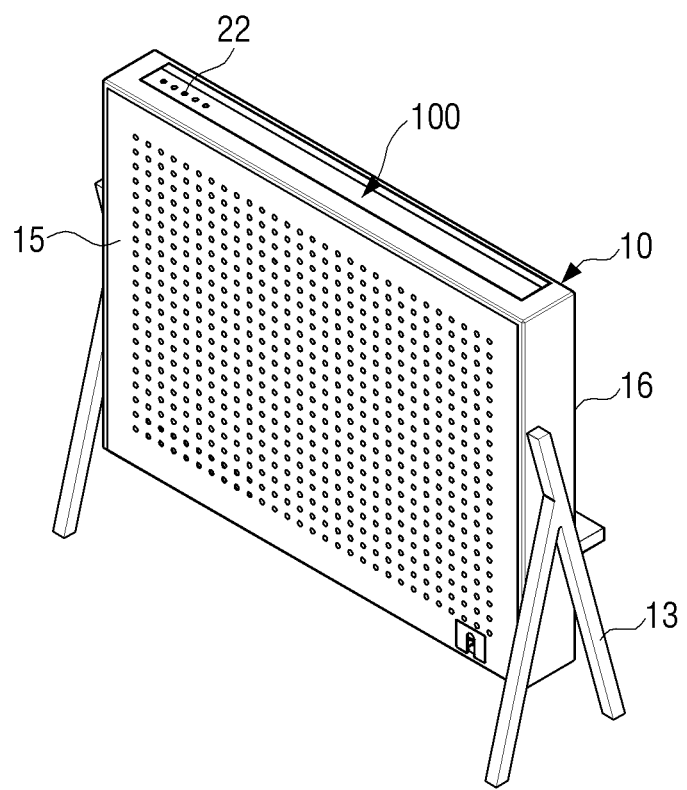
FIGS. 1A and 1B are diagrams illustrating implementation examples of an audio-visual system, according to an exemplary embodiment.

Certain exemplary embodiments are described below in greater detail with reference to the accompanying drawings.

In the following description, like drawing reference numerals are used for the like elements, even in different drawings. The matters defined in the description, such as detailed construction and elements, are provided to assist in a comprehensive understanding of the exemplary embodiments described herein. However, other exemplary embodiments can be practiced without those specifically defined matters. Also, well-known functions or constructions are not described in detail since they would obscure the application with unnecessary detail.

Figure 1B:
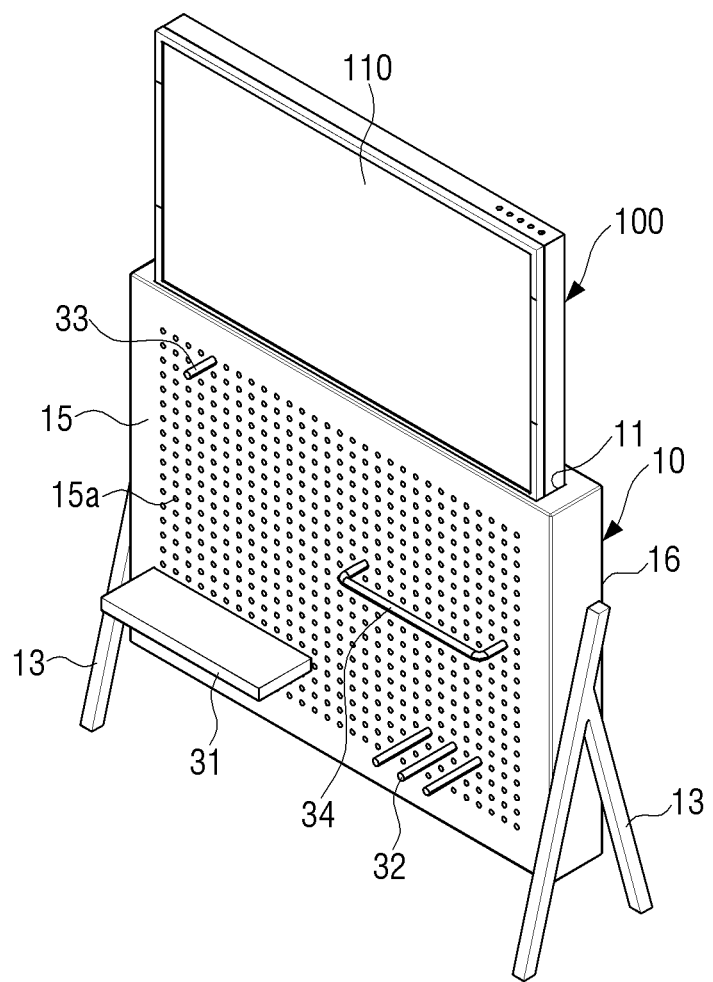

FIGS. 1A and 1B are diagrams illustrating implementation examples of an audio-visual system, according to an exemplary embodiment.

Referring to FIG. 1A, an audio-visual system 1000 may include an audio-visual device 100, a housing 10, and a lifting device (not shown).

The audio-visual device 100 may be configured to provide functions of a visual device for displaying images and an audio device for outputting and recording sounds. For example, the audio-visual device 100 may be used as a visual device, such as, a TV, a monitor, and the like, or may be used as an audio device for reproducing, outputting, or recording diverse formats of sound sources. In this case, a display of the audio-visual device 100 may be formed as a flat panel in a rough rectangular shape, like a common Liquid Crystal Display (LCD) TV or Organic Light-Emitting Diode (OLED) TV. Further, the display of the audio-visual device 100 may be formed as a curved-surface panel with certain curvature. The following exemplary embodiments will be described with the assumption that a display 110 is formed in a flat panel shape.

The housing 10 includes an internal space for storing the audio-visual device 100 and an opening 11 on an upper end. Accordingly, the housing 10 is formed to correspond to a shape of the audio-visual device 100. As illustrated in FIG. 1B, the audio-visual device 100 may selectively protrude from an upper side of the housing 10 through the opening 11 formed on the upper end of the housing 10. The housing 10 may be realized such that the audio-visual system 1000 including the audio-visual device 100 functions as furniture for storage and interior decoration. Accordingly, an external surface of the housing 10 may be designed so as to allow various decorations and storage.

To be specific, a couple of support stands 13 for supporting the housing 10 with respect to a floor surface are provided on both lateral surfaces of the housing 10. The couple of support stands 13 are installed such that a bottom surface of the housing 10 is spaced apart from the floor surface. In this case, the floor surface may include a floor of a place where the housing 10 is installed, for example, a room, a living room, a bed room, an office, a public space, or the like.

A plurality of holes 15a are formed on a front surface 15 of the housing 10. The plurality of holes 15a are formed to fix accessories 31, 32, 33, 34. The accessories 31, 32, 33, 34 are fixed by means of the plurality of holes 15a on the front surface 15 of the housing 10 so as to support objects, for example, a book, with respect to the housing 10. By way of example, as illustrated in FIG. 1B, the accessory 31 may be formed in a flat-panel shape to be fixed by using one or more of the plurality of holes 15a. The accessories 32, 33 may be formed in a rod shape to be fixed to one or more of the plurality of holes 15a through its one end. The accessory 34 may be formed in a rough bracket shape to be fixed to one or more of the plurality of holes 15a through its both ends. An accessory may be formed in a rough 'L' shape to be fixed to one or more of the plurality of holes 15a through its one end. The accessories 31, 32, 33, 34 in FIG. 1B are only examples for illustrative purpose, and the shape of the accessory is not limited thereto.

In the same manner as on the front surface 15 of the housing 10, a plurality of holes may additionally or alternatively be formed on a rear surface 16 of the housing 10, and various accessories may be fixed to the plurality of holes on the rear surface 16 of the housing 10.

Meanwhile, at least one speaker for outputting sound of a content reproduced in the audio-visual device 100 may be installed around the bottom surface in the housing 10. As an example, two speakers may be installed inside the housing 10 separately from the audio-visual device 100. The sounds output from the two speakers may be transmitted to an outside through the plurality of holes 15a on the front surface 15 of the housing 10 and/or the plurality of holes on the rear surface 16 of the housing 10. In this case, the housing 10 may expand a volume of a sound box of the speakers, thereby improving sound quality. Further, an opening corresponding to the speaker(s) on the front surface 15 of the housing 10 may be formed such that a front surface of the speaker(s) is exposed to the outside. The at least one speaker may additionally or alternatively be installed outside the housing 10.

As described above, it is able to achieve an effect of using a speaker larger than an embedded speaker of the audio-visual device 100 by installing at least one speaker separately from the audio-visual device 100. Accordingly, the audio-visual device 100 may provide good sound quality when used as the audio device. Needless to say, a speaker may be also embedded in the audio-visual device 100.

A lifting device (FIG. 2B, 200) is configured to expose the audio-visual device 100 or store the audio-visual device 100 inside the housing 10 through the upper end of the housing 10.

The lifting device (200) is installed on a lower part of the audio-visual device 100 in the housing 10 and may be realized as a lifting unit (210) for vertically moving the audio-visual device 100 with respect to the housing 10. That is, the lifting device (200) makes the audio-visual device 100 protrude outside the housing 10 through the opening 11 on the upper end of the housing 10 such that the display 110 is exposed and also makes the protruded audio-visual device 100 descend so as to be stored in the housing 10. As the audio-visual device 100 is stored in the housing 10, the display 110 of the audio-visual device 100 is protected by the housing 10.

The lifting device (200) may be configured to locate the audio-visual device 100 at at least two different heights. For example, the lifting device (200) may be configured to move the audio-visual device 100 between a first position where the audio-visual device 100 is entirely stored in the housing 10 so as not to be exposed to the outside of the housing 10 and a second position where at least a part of the audio-visual device 100 is exposed to the outside of the housing 10. In this case, the second position may include a position where the display 110 of the audio-visual device 100 is entirely exposed to the outside and/or a position where only a part of the display 110 of the audio-visual device 100 is exposed to the outside.

For doing this, the lifting device (200) may include a lifting unit (210) configured to be installed on a lower part of the display 110 of the audio-visual device 100 to make the display 110 protrude through the upper end of the housing 10 and a driving unit (220) configured to drive the lifting unit (210). In this case, the driving unit (220) may be configured to drive the lifting unit (210) by rotation of a motor. For example, the number of rotations of the motor may be adjusted to correspond to the height of the audio-visual device 100.

Figure 2A:
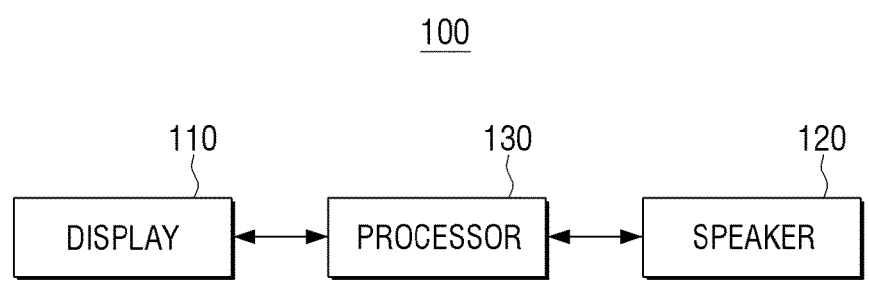
FIG. 2A is a diagram illustrating a structure of an audio-visual device, according to an exemplary embodiment.
Figure 2B:
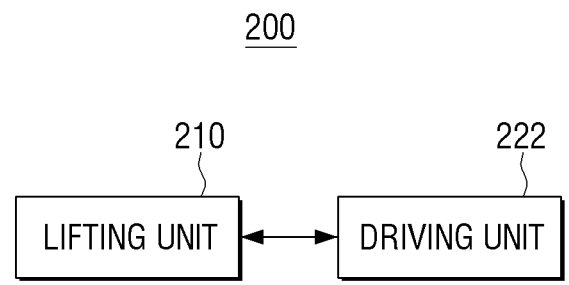
FIG. 2B is a diagram illustrating a structure of a lifting device, according to an exemplary embodiment.

FIG. 2A is a diagram illustrating a structure of an audio-visual device, according to an exemplary embodiment.

Referring to FIG. 2A, an audio-visual device 100 includes the display 110, a speaker 120, and a processor 130.

The audio-visual device 100 may be realized as a smart TV, a monitor, or the like, but not limited thereto. The audio-visual device 100 may be realized as various types of devices providing a display function, for example, a Large Format Display (LFD), a digital signage, a Digital Information Display (DID), a video wall, a projector display, and so on.

The display 110 may display diverse content screens that may be provided through the audio-visual device 100. In this case, the content screens may include various contents including images, moving images, text, music, or the like, an application execution screen including various contents, a Graphic User Interface (GUI) screen, and so on.

The display 110 may be realized as diverse types of displays, such as, LCD, OLED, Liquid Crystal on Silicon (LCoS), Digital Light Processing (DLP), or the like. Further, the display 110 may be realized as a transparent display with transparent materials to display information. In some cases, the display 110 may be realized as a touch screen that forms a mutual layer structure with a touch pad. The display 110 may be used as a User Interface (UI), as well as an output device, in this case.

The at least one speaker 120 is installed on at least one side of the display 110. The speaker 120 converts electric pulses into sound waves. The speaker 120 may be realized as a dynamic type classified by principles and methods for converting electronic signals into sound waves, but not limited thereto. That is, the speaker 120 may be realized as an electrostatic type, a dielectric type, a magneto striction type, or the like. Further, the speaker 120 may be realized as a multi-way type that divides a register of a frequency band into a low register, a middle register, and a high register and assigns each register to a proper speaker.

The processor 130 may control overall operations of the audio-visual system 1000 including the audio-visual device 100. The processor 130 may include one or more components from among a Central Processing Unit (CPU), a controller, an Application Processor (AP), a Communication Processor (CP), and an ARM processor.

The processor 130 may control the audio-visual system 1000 to operate in a first mode for outputting a media art content while the display 110 is stored in the housing 10 in response to a first event, operate in a second mode for outputting an audio content through the speaker 120 while a part of the display 110 is exposed to the outside through the upper end of the housing 10 in response a second event, and operate in a third mode for outputting a visual content while the entire display 110 is exposed to the outside through the upper end of the housing 10 in response a third event.

In response to a mode being determined according to an event, the processor 130 may control the operation of the lifting device (200) such that the display 110 is exposed or is stored in a state corresponding to the determined mode. For example, when the lifting device (200) includes the lifting unit (210) being installed on the lower part of the display 110 of the audio-visual device 100 so as to make the display 110 project through the upper end of the housing 10 and the driving unit (220) for driving the lifting unit (210) by means of the motor, the processor 130 may control the driving unit (220) of the lifting device (200) such that the number of rotations of the motor is adjusted according to the determined mode.

The first to third events for executing the first to third modes may be the events where each mode is selected by a user command. As an example, the events may include an event where a mode is selected by a remote control device including a remote controller, an event where a mode is selected by a user gesture or user voice command, an event where a mode is selected by a button on the audio-visual device 100, and so on. As another example, a plurality of selection switches 22 for selecting a projecting state of the audio-visual device 100 may be provided on an upper bezel area of the audio-visual device 100. The plurality of selection switches correspond to each of a plurality of heights where the audio-visual device 100 may be located, respectively. Accordingly, in response to one of the plurality of selection switches being pressed, the processor 130 locates the audio-visual device 100 at a height corresponding to the pressed selection switch, and then a mode corresponding to the height is executed automatically.

The events are not limited to the above-described examples, and the events may further include an event where a certain type of content is selected, an event where a predetermined time arrives, an event where an exposure degree of the audio-visual device 100 is adjusted manually, an event where a user is recognized, and the like. As an example, the processor 130 may control the audio-visual system 1000 to automatically operate in the first mode in response to receiving a command for selecting a media art content, automatically operate in the second mode in response to receiving a command for selecting an audio content, and automatically operate in the third mode in response to receiving a command for selecting a visual content. As another example, when the audio-visual device 100 is realized as a large display device, such as, the LFD or DID, the audio-visual system 1000 may operate in the first mode or in the second mode while a user is not recognized in front of the audio-visual device 100 and operate in the third mode for displaying a content, such as, an advertisement or the like, when a user is recognized in front of the audio-visual device 100. As still another example, the audio-visual system 1000 may operate in the first mode for displaying the media art content providing appropriate illumination for sleeping during a predetermined time (for example, a bedtime from 12:00 a.m. to 7:00 a.m.).

Meanwhile, according to an exemplary embodiment, a user terminal device, such as, a mobile phone, may be used as the remote control device. As an example, the mobile phone may be triggered to provide a remote control function with respect to the audio-visual system 1000 through a contact or Near Field Communication (NFC) with respect to the audio-visual system 1000. As another example, the mobile phone may be automatically triggered to provide the remote control function with respect to the audio-visual system 1000 based on at least one of a user location, a time, and content use information. As still another example, in response to the mode being converted, the mobile phone may be automatically changed such that a button that may be used on the mobile phone (for example, a touch button) corresponds to the converted mode.

In response to the mode being determined (or executed) according to an event, the processor 130 may automatically communicate with a source device providing content that is outputtable in the determined mode. For example, the processor 130 may automatically communicate with a source device providing a media art content in the first mode, automatically communicate with a source device providing an audio content in the second mode, and automatically communicate with a source device providing a visual content in the third mode. In this case, the communication connection may refer to all kinds of communication able states, for example, communication initiation, network formation, or device pairing between the audio-visual device 100 and a source device. As an example, device identification information on the audio-visual device 100 may be transmitted to the source device, and then pairing between the audio-visual device 100 and the source device may be performed. As another example, in response to a predetermined event occurring in the audio-visual device 100, a peripheral may be searched through a Digital Living Network Alliance (DLNA) method, and then the pairing may be performed such that the peripheral operates with a source device corresponding to the determined mode.

In this case, the processor 130 may display a list of contents that may be provided by the connected source device. For example, in response to a set-top box being connected as the third mode is selected, the processor 130 may display an Electronic Program Guide (EPG) list. In response to the mobile phone (or external server) being connected as the second mode is selected, the processor 130 may receive and display a list of audio contents that may be provided by the mobile phone (or external server). In response to a pre-stored contents being provided, the processor 130 may automatically display a list of the pre-stored contents corresponding to each mode, needless to say.

In response to the mode being determined according to an event, the processor 130 may perform local dimming to at least a part of a screen area of the display 110 based on an image size of a content output in the determined mode. For example, in response to information on an audio content reproduced in the second mode being provided to only a part of a screen area exposed to the outside of the housing 10, the processor 130 may perform the local dimming to the other screen area than the exposed screen area, that is, a screen area located inside the housing 10, thereby reducing power consumption.

In response to the mode being determined according to an event, the processor 130 may control the mode to be converted to an optimal output mode where the user is able to view or listen to a content based on properties of the content provided in the determined mode.

As an example, in response to the mode being determined according to an event, the processor 130 may activate at least one speaker to correspond to the audio content output in the determined mode and automatically adjust a sound output volume to correspond to the determined mode. For example, an appropriate speaker and sound output volume may have been set for each mode.

As another example, in response to the mode being determined according to an event, the processor 130 may automatically perform sound equalizing corresponding to the sound output in the determined mode. For instance, in response to the audio content being reproduced in the second mode, the processor 130 may automatically perform the sound equalizing corresponding to a genre of the audio content (for example, a rock genre).

As another example, in response to the mode being determined according to an event, the processor 130 may adjust output brightness of a pixel based on the properties of the determined mode. That is, the processor 130 may decrease the pixel brightness in the first and second modes and increase the pixel brightness in the third mode. Alternatively, the processor 130 may convert the output mode to a low-power mode where the pixel brightness is decreased automatically, in the first and second modes.

The processor 130 may change a display position or brightness of a content according to a user command in each mode. For example, the processor 130 may change the display position of a media art content in the first mode according to a user gesture command or change the brightness of the media art content to change ambient illuminance.

The processor 130 may provide a predetermined feedback in response to mode conversation. For example, the processor 130 may provide at least one of a visual feedback providing a predetermined image and an auditory feedback providing a predetermined sound. In this case, the processor 130 may provide different types of feedbacks related to the characteristics of a converted mode. For example, the processor 130 may provide the visual feedback in response to the mode being converted from a certain mode to the first mode and provide the auditory feedback in response to the mode being converted from a certain mode to the second mode.

In the first mode, the processor 130 may automatically communicate with an external source (for example, an external electronic device, an external server, or the like) providing the media art content to receive the media art content or display the media art content pre-stored in the audio-visual device 100 on the screen of the display 110. In this case, the operation of receiving and displaying the media art content from the external source may include an operation of downloading content from the external source and reproducing the content by the processor 130 and an operation of receiving content reproduced in the external source (for example, a mobile phone) in a streaming manner and displaying the content. In this case, in response to a resolution of the media art content downloaded or received from the external source in the streaming manner being different from a resolution of the display 110, the processor 130 may convert a format of the content to an appropriate resolution and then display the content.

In this case, the media art content may be content selected by the user when the mode is selected or may be content set by default to be automatically provided when the mode is selected. As an example, in response to a predetermined bedtime arriving, the processor 130 may execute the first mode automatically and display the media art content for helping with the user's sleep in order to use the media art content as a sleeping light.

In addition, the media art content may be content including at least one of a video and an audio. According to the setting in the first mode, only a part of the content may be provided. For example, although the media art content is content including both the video and the audio, the processor 130 may reproduce only the video, except for the audio, through demultiplexing according to the setting in the first mode.

The media art content received from the external source, such as, the user terminal device, may be content edited through an editor UI provided by the user terminal device.

As an example, the user is able to edit and generate media art content providing a pattern for helping with the sleeping through the editor UI. In this case, the processor 130 may transmit the information on the audio-visual device 100 (for example, the resolution or the like) to the user terminal device, and the user terminal device may provide the editor UI based on the received information. By way of example, an application for controlling the audio-visual device 100 providing three kinds of modes according to the present exemplary embodiment may be installed in the user terminal device, and the user terminal device may control the modes of the audio-visual device 100 through the application.

The processor 130 may change a display range automatically according to an attachment state of the accessory 31, 32, 33, 34 on the front surface 15 of the housing 10. To be specific, the processor 130 may sense the attachment state of the accessory 31, 32, 33, 34 by means of a proximity sensor or the like and display the media art content in a screen area that is not blocked by the accessory 31, 32, 33, 34, based on the sensing result.

As described above, in response to the media art content being output while the audio-visual device 100 is entirely stored in the housing 10, the light emitted through the plurality of holes 15a on the front surface 15 of the housing 10 may be utilized as a media object or illumination.

According to circumstances, the processor 130 may display the media art content by exposing a part of the display 110 to the outside of the housing 10 in the first mode in order to provide the illumination function. In this case, the processor 130 may display a single content on the entire screen or display a content only in the exposed area. Further, the processor 130 may display different contents in the exposed display area and an unexposed area.

The processor 130 may automatically communicate with an external source providing an audio content (for example, an external electronic device, an external server, or the like) in the second mode to receive the audio content (for example, an audio file with a file extension, such as, MP3, WMA, OGG, WAV, or the like) or may reproduce the audio content pre-stored in the audio-visual device 100. In this case, the operation of receiving and reproducing the audio content from the external source may include an operation of downloading the audio content from the external source and reproducing the audio content by the processor 130 and an operation of receiving the audio content reproduced in the external source (for example, a mobile phone) in the steaming manner and outputting the audio content.

In this case, the processor 130 may reconstruct and display information on the reproduced audio content (for example, information on albums, singers, lyrics, genres, titles, tracks, and so on) to correspond to the exposed display area. As an example, the processor 130 may convert the information to a UI with a certain ratio corresponding to the exposed display area (for example, 80 mm with respect to a 32-inch display area). As another example, the processor 130 may display a UI where a bit equalizer and a reproduction progress bar are shown in an overlapping manner, in the corresponding area.

In this case, a UI corresponding to the audio content received from the external source, such as, the user terminal device, may be a UI edited through the editor UI provided by the user terminal device. For example, the user terminal device may provide a UI for editing the information on the audio content (for example, Info Dashboard) through the above-described certain application, and the information edited through the application may be transmitted to the audio-visual device 100. Further, in response to predetermined information on the audio content (for example, albums, singers, or the like) automatically being transmitted to the audio-visual device 100, the processor 130 may reconstruct the received information to be an appropriate form of UI and display the UI in the exposed display area.

According to circumstances, in the second mode, the processor 130 may split the screen area and provide different contents in each screen area. For instance, the processor 130 may provide a UI corresponding to the audio content to a first screen area exposed to the outside and provide the media art content to a second screen area unexposed to the outside. In this case, the processor 130 may control the brightness of the first and second screen areas individually to adjust the brightness of each screen area differently. The brightness of each screen area may be controlled individually according to the user command.

In response to the second mode being executed, the processor 130 may automatically perform the sound equalization corresponding to the genre of the output audio content. By way of example, the processor 130 may perform corresponding sound equalization according to whether the genre of the output audio content is classical music, rock music, hip-hop music, electronica, or ballad. Further, the processor 130 may automatically adjust the output volume to correspond to the genre of the output audio content.

In the third mode, the processor 130 may automatically communicate with an external source (for example, a set-top box or the like) providing a visual content to receive a visual content (for example, a video file with a file extension, such as, MPEG, MPG, MP4, AVI, MOV, MKV, or the like) or reproduce a video content pre-stored in the audio-visual device 100. In this case, the operation of receiving and reproducing the visual content from the external source may include an operation of downloading the visual content from the external source and reproducing the visual content by the processor 130 and an operation of receiving the visual content reproduced in the external source (for example, a mobile phone) in the steaming manner and outputting the visual content.

In response to receiving the visual content from the external source, the processor 130 may transmit information regarding the resolution of the visual content that is processible in the audio-visual device 100, the performance of a decoder installed in the audio-visual device 100, a codec type, or the like to the external source and receive a visual content whose format has been converted to correspond to the information from the external source. Further, the processor 130 may convert a format of the visual content received from the external source to a format that is outputtable in the audio-visual device 100 and then display the visual content.

The processor 130 may control a screen area in an appropriate size to be exposed to the outside of the housing 10 according to a ratio of the visual content to be output in the third mode (for example, ratios of 16:9, 21:9, 4:3, 1:1, or the like). That is, in the third mode, the processor 130 may control the entire screen of the display 110 to be exposed to the outside of the housing 10 by default or may control only a part of the screen to be exposed to the outside of the housing 10 according to circumstances.

In this case, the processor 130 may adjust the size of the screen area exposed to the outside of the housing 10 so as not to show a black screen area (or a content non-display area, for example, upper and lower black bar areas in a 21:9-ratio screen) determined by the ratio of the visual content to be output.

Figure 3:
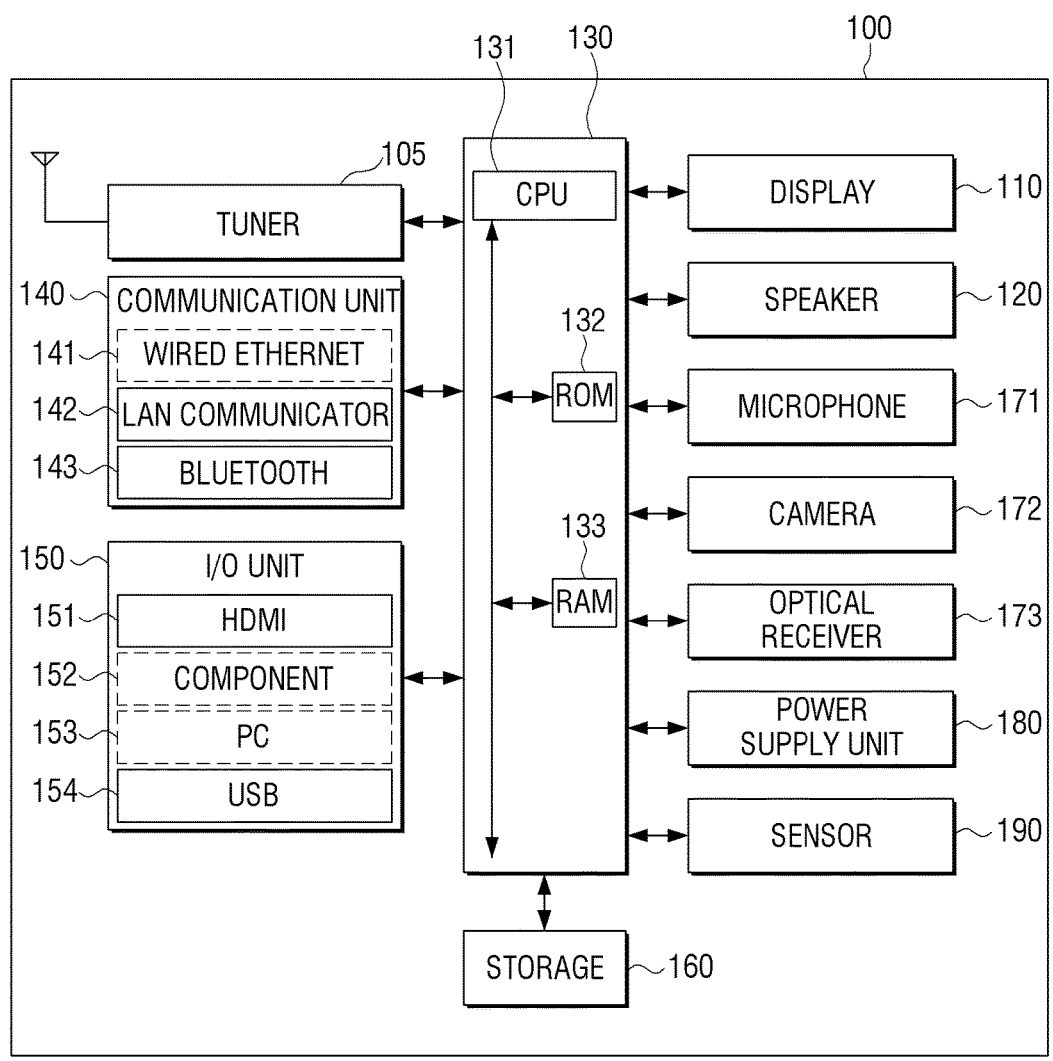
FIG. 3 is a block diagram illustrating a detailed structure of the audio-visual device of FIG. 2.

FIG. 3 is a block diagram illustrating a detailed structure of the audio-visual device 100 of FIG. 2A.

Referring to FIG. 3, the audio-visual device 100 includes the display 110, the speaker 120, the processor 130, a communication unit 140, an Input/Output (I/O) unit 150, a storage 160, a microphone 171, a camera 172, an optical receiver 173, and a power supply unit 180. Some of the components of FIG. 3 overlap the components of FIG. 2A, and thus, a repeated description thereof will be omitted.

The processor 130 may include a CPU 131, a Read-Only Memory (ROM) 132 (or a non-volatile memory) storing a control program for controlling the audio-visual system 1000 including the audio-visual device 100, and a Random Access Memory (RAM) 133 (or a volatile memory) for storing data inputted from the external source or being used as a storage area corresponding to various operations of the audio-visual device 100.

The processor 130 controls overall operations of the audio-visual system 1000 including the audio-visual device 100, controls a signal flow of the components 110-173 of the audio-visual device 100, and processes data. According to circumstances, a first processor for controlling the audio-visual device 100 and a second processor for controlling the lifting device (200) may be provided separately. In this case, the second processor may include a motor controller for controlling the driving status of the driving unit (220) in response to a control signal for the lifting device (200) being received from the first processor. For convenience in explanation, it is assumed that the motor controller is realized as a single body with the processor 130.

The processor 130 controls power supplied to the components 110-173 by the power supply unit 180. Further, in response to a predetermined event occurring, the processor 130 may execute an Operating System (O/S) and diverse applications stored in the storage 160.

The processor 130 may include a Graphic Processing Unit (GPU) for processing graphics corresponding to images. The processor 130 may be realized as a System On Chip (SoC) including a core and a GPU. Further, the processor 130 may include a single-core, a dual-core, a triple-core, a quad-core, or any number of cores in multiples thereof.

The CPU 131 accesses the storage 160 and performs a boot-up operation by using the O/S stored in the storage 160. Then, the CPU 131 performs various operations by using diverse programs, contents, and data in the storage 160.

The ROM 132 stores a set of commands for system booting. In response to the power being supplied by a turn-on command, the CPU 131 copies the O/S in the storage 160 to the RAM 133 according to the commands stored in the ROM 132, and boots up the system by executing the O/S. Upon completion of the boot-up operation, the CPU 131 copies various application programs in the storage 160 to the RAM 133 and executes the programs copied to the RAM 133 to perform various operations. The CPU 131, the ROM 132, and the RAM 133 may be interconnected through an internal bus.

The audio-visual device 100 may be connected to an external device in a wired and/or wireless manner by using the communication unit 140 or the I/O unit 150. The external device may include a mobile phone, a smart phone, a tablet, a Personal Computer (PC), a server, or the like.

The communication unit 140 may connect the audio-visual device 100 with the external device by the control of the processor 130. The processor 130 may download content from the external source or receive content from the external source in the streaming manner through the communication unit 140. Specifically, in response to the mode being determined according to an event, the processor 130 may control the communication unit 140 to automatically communicate with the source device providing content which is outputtable in the determined mode.

The communication unit 140 may include at least one of a wired Ethernet 141, a wireless Local Area Network (LAN) communicator 142, and a Bluetooth communicator 143, according to the performance and structure of the audio-visual device 100.

The I/O unit 150 receives various contents from the external source by the control of the processor 130. The contents may include at least one of videos, images, text, and sounds, for example. The I/O unit 150 may include at least one of a High Definition Multimedia Interface (HDMI) input port 151, a component input jack 152, a PC input port 153, and a Universal Serial Bus (USB) input jack 154.

The storage 160 may store various data, programs, or applications for driving and/or controlling the audio-visual device 100.

The storage 160 may store a control program for controlling the audio-visual device 100 and the processor 130, applications initially provided by a manufacturer or downloaded from an external source, GUIs related to the applications, objects for providing the GUIs (for example, images, text, icons, buttons, or the like), user information, documents, databases, related data, and so on.

The storage 160 may include a broadcasting receiving module, a channel control module, a volume control module, a communication control module, a voice recognition module, a motion recognition module, an optical receiving module, a display control module, an audio control module, an external input control module, a power control module, a voice database (DB), or a motion database (DB). The processor 130 may execute the functions of the audio-visual device 100 by using software stored in the storage 160.

The storage 160 may include a memory card mounted in the audio-visual device 100 (for example, a micro Secure Digital (SD) card, a USB memory, or the like), an external memory connectable to the USB input jack 154 of the I/O unit 150 (for example, a USB memory or the like), a non-volatile memory, a volatile memory, a Hard Disk Drive (HDD), or a Solid State Drive (SSD).

The microphone 171 receives and converts a user voice or other sounds to audio data. The camera 172 captures a still image or a moving image according to the user control. The processor 130 may use the user voice inputted through the microphone 171 during a call process or convert the user voice to the audio data and store the converted audio data in the storage 160. When the audio-visual device 100 includes the microphone 171 and the camera 172, the processor 130 may perform various control operations, for example, an operation of selecting one of the first to third modes, in response to the user voice inputted through the microphone 171 or a user motion recognized through the camera 172.

The optical receiver 173 receives an optical signal (including control information) output from the remote control device through an optical window.

The optical receiver 173 may receive the optical signal corresponding to a user input (for example, touch, pressing, touch gesture, voice, or motion) from the remote control device. In this case, the control information extracted from the received optical signal may be transmitted to the processor 130.

The power supply unit 180 supplies power received from an external power source to the components 110-180 in the audio-visual device 100 by the control of the processor 130.

A tuner 105 may tune and select only a frequency of a desired channel to be received in the audio-visual device 100 from among many radio wave elements of broadcasting signals received in a wired and/or wireless manner, through amplification, mixing, resonance, or the like. For example, the tuner 105 may tune and provide a broadcasting channel according to a user selection in the third mode.

On top of the above-described components, the audio-visual device 100 may further include any number of sensors (190), such as, a sensor for sensing an accessory attached to the front surface 15 of the housing 10 and its attached position, a sensor for sensing the outside exposure degree of the display 110.

Figure 4:
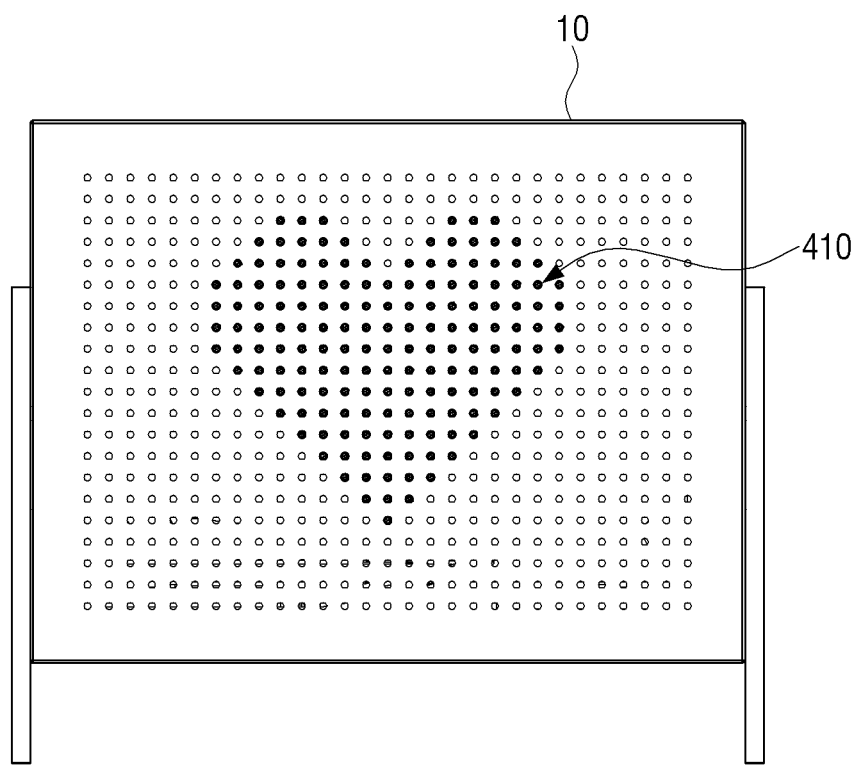
FIG. 4 is a diagram provided to describe an operating method in a first mode, according to an exemplary embodiment.

FIG. 4 is a diagram provided to describe an operating method in a first mode, according to an exemplary embodiment.

As illustrated in FIG. 4, in response to the first mode being executed according to a first event, media art content may be output while the display 110 is stored in the housing 10. For example, in response to a heart-shaped content being output as illustrated in FIG. 4, the heart shape 410 is shown through the plurality of holes 15*a* on the front surface 15 of the housing 10, and thus, the media art effect. In this case, the first event may be various kinds of events, for example, an event where a user selects the first mode, an event where a predetermined time arrives (for example, 10:00 p.m.), an event where no user input is received over a predetermined time in the third mode, and so on.

Figure 5:
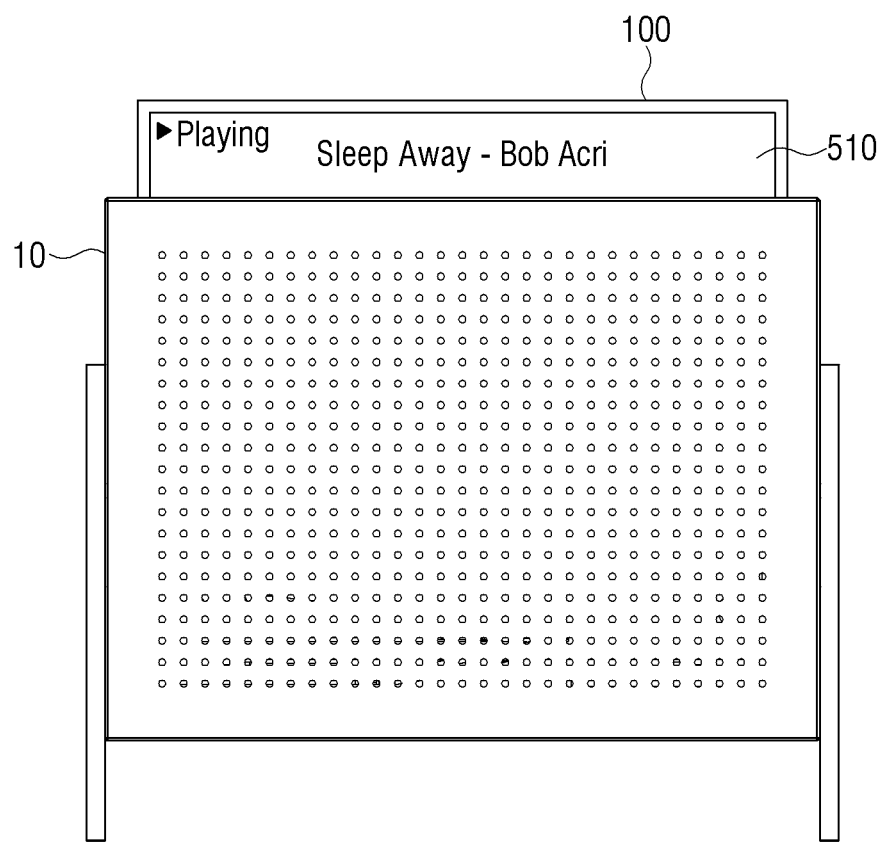
FIG. 5 is a diagram provided to describe an operating method in a second mode, according to an exemplary embodiment.

FIG. 5 is a diagram provided to describe an operating method in a second mode, according to an exemplary embodiment.

As illustrated in FIG. 5, in response to the second mode being executed according to a second event, the audio content may be output through the speaker 120 while a part of the display 110 is exposed to the outside through the upper end of the housing 10. In this case, an exposed display area 510 may display a UI including the information on the output audio content (for example, information on albums, singers, lyrics, genres, titles, tracks, or the like).

Figure 6A:
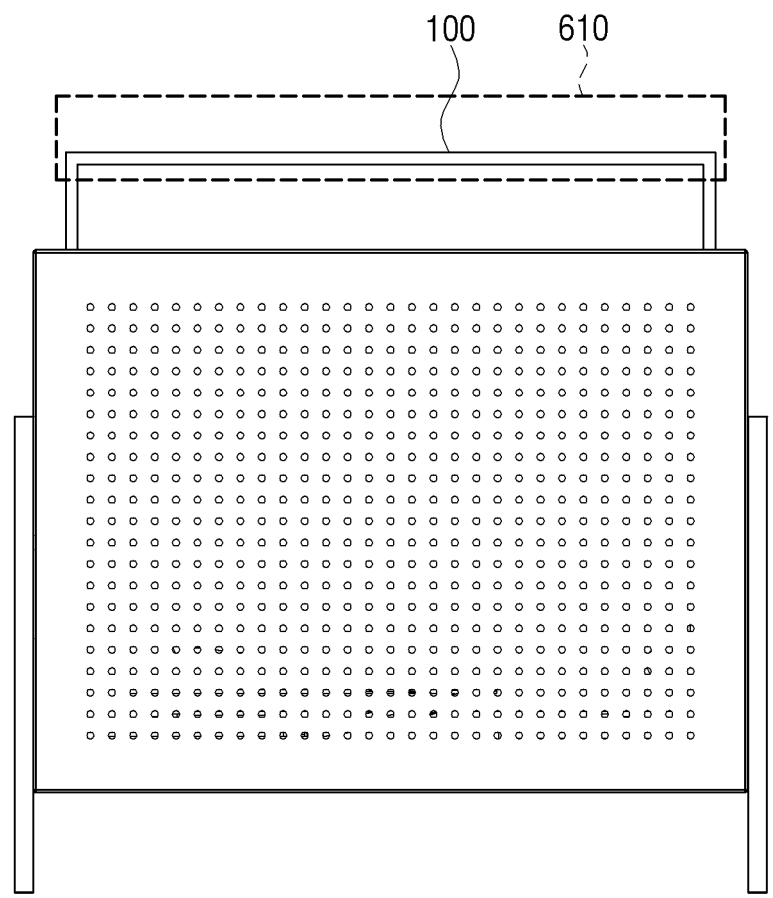
FIGS. 6A to 6C are diagrams provided to describe installation positions of a speaker, according to an exemplary embodiment.
Figure 6B:
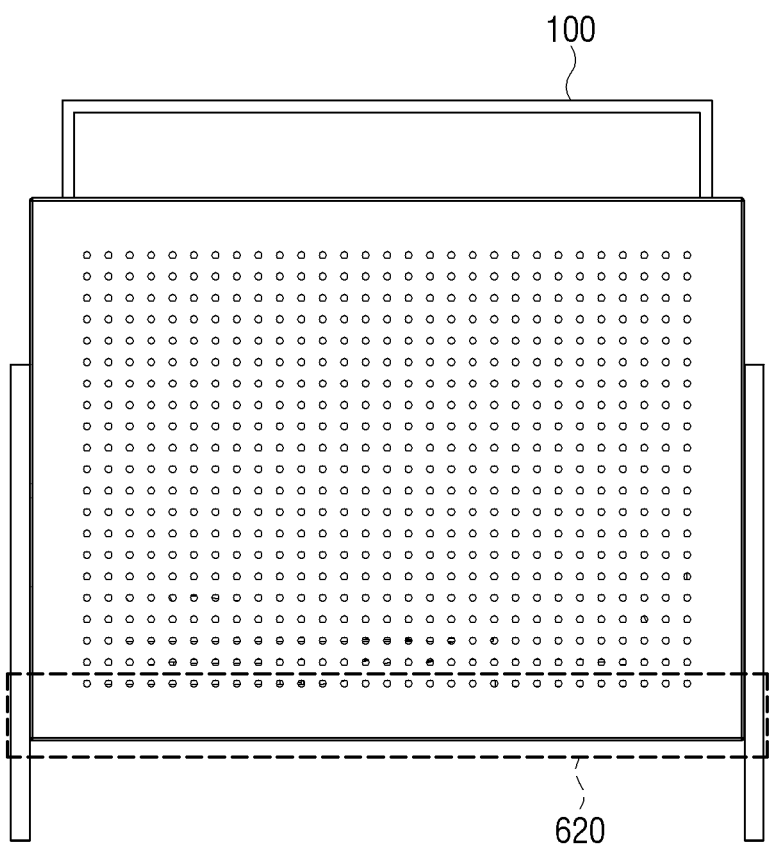
Figure 6C:
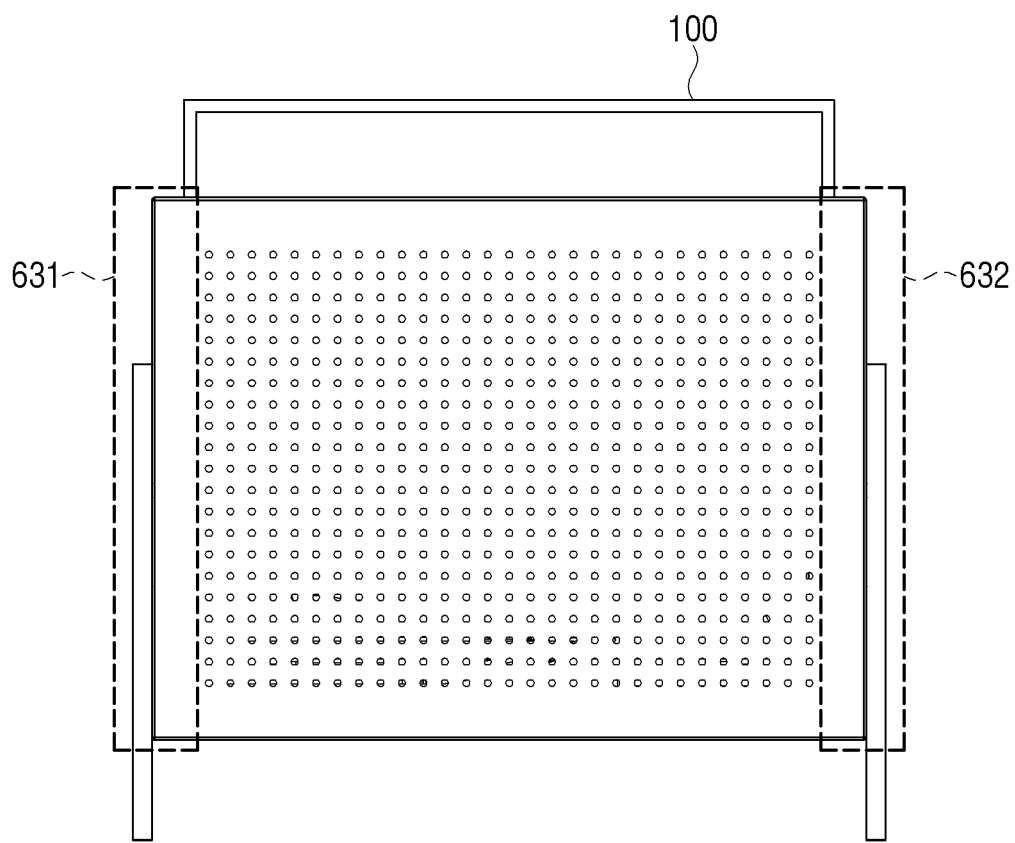

FIGS. 6A to 6C are diagrams provided to describe installation positions of a speaker, according to an embodiment.

According to an exemplary embodiment, at least one speaker may be installed at various positions as illustrated in FIGS. 6A to 6C.

As an example, as illustrated in FIG. 6A, at least one speaker for outputting the sound of content reproduced in the audio-visual device 100 may be installed around an upper part 610 of the audio-visual device 100.

As another example, as illustrated in FIG. 6B, at least one speaker for outputting the sound of the content reproduced in the audio-visual device 100 may be installed around the bottom surface in the housing 10.

As still another example, as illustrated in FIG. 6C, two speakers may be installed on a left side 631 and on a right side 632 inside the housing 10, separately from the audio-visual device 100.

An opening corresponding to the at least one speaker may be formed on the front surface 15 of the housing 10 such that a front surface of the speaker is exposed to the outside. Further, the at least one speaker may be installed outside the housing 10.

Meanwhile, in the above-described exemplary embodiments, the speakers are installed at different positions according to respective embodiments, but not limited thereto. The speakers may be installed according to a combination of at least two exemplary embodiments.

Figure 7A:
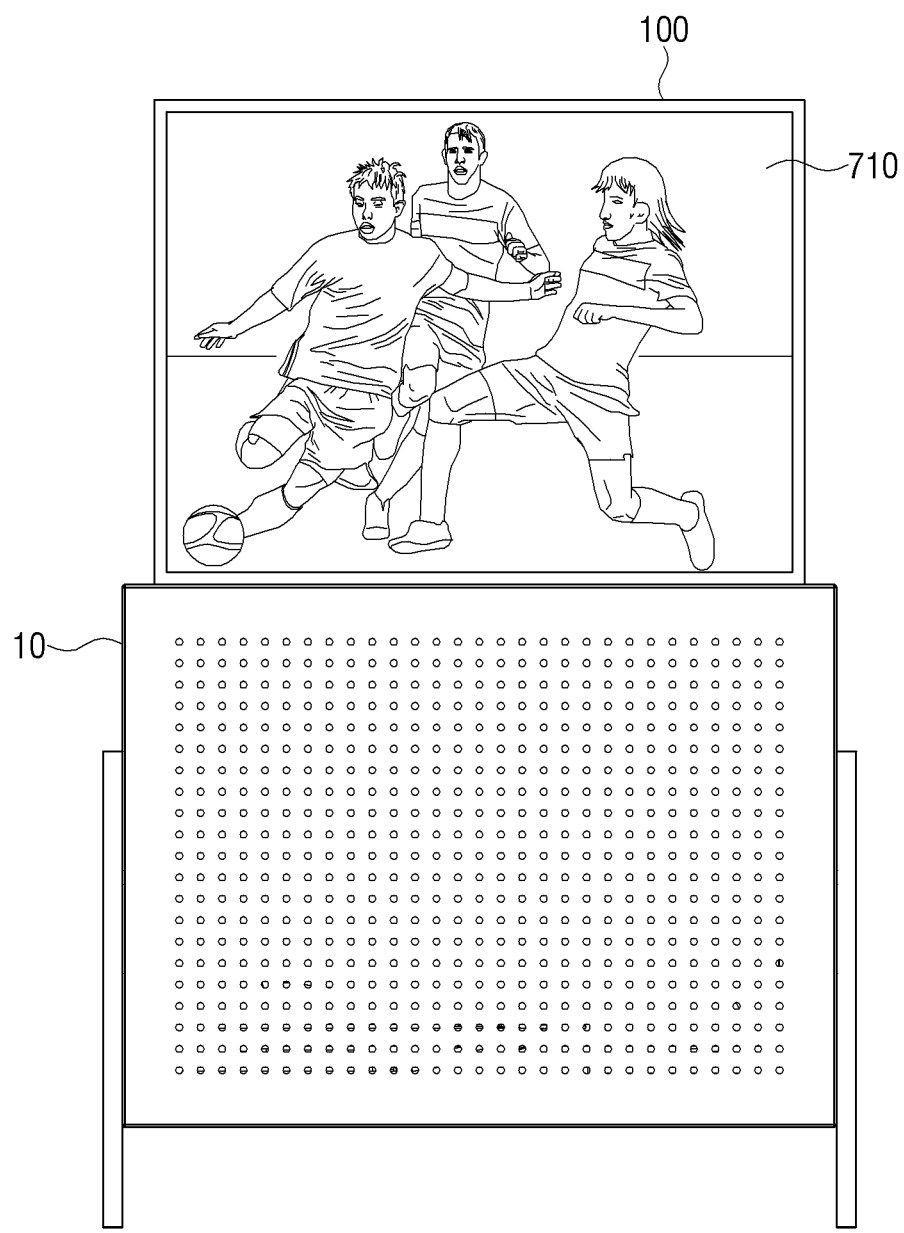
FIGS. 7A and 7B are diagrams provided to describe an operating method in a third mode, according to an exemplary embodiment.
Figure 7B:
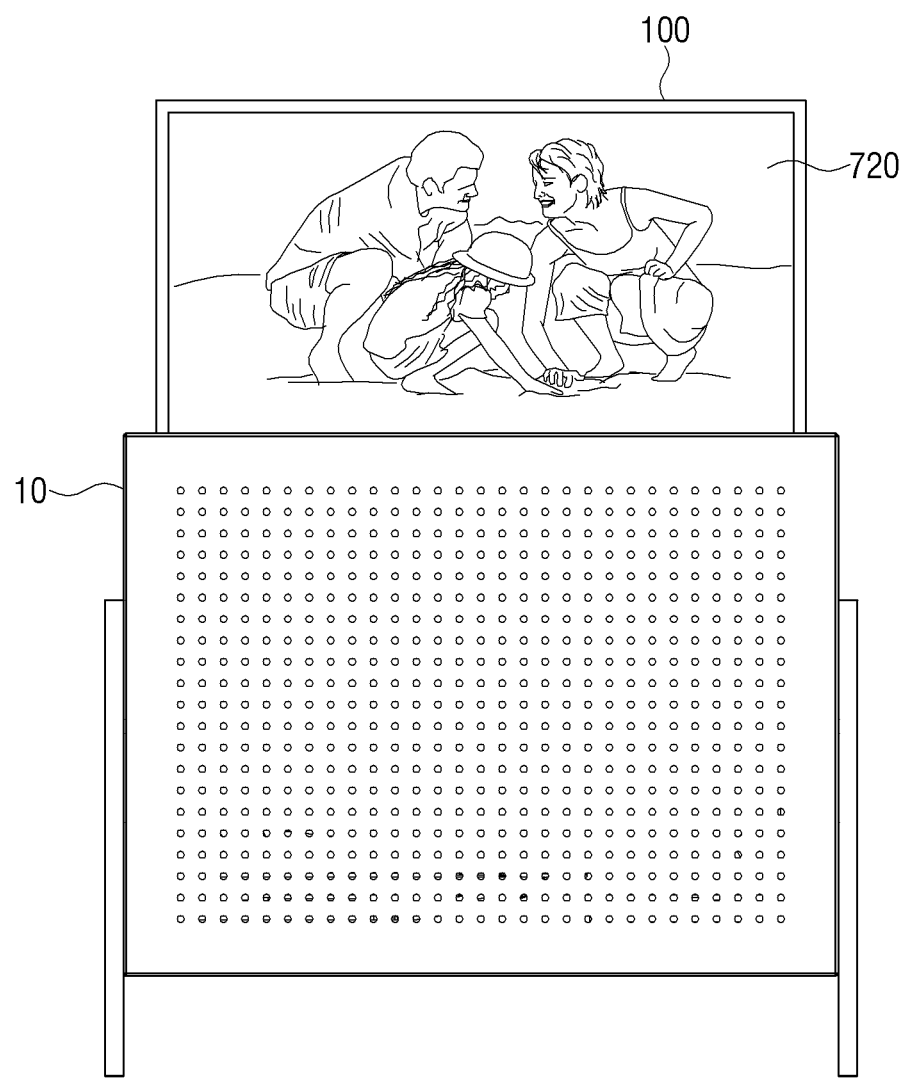

FIGS. 7A and 7B are diagrams provided to describe an operating method in a third mode, according to an exemplary embodiment.

In response to the third mode being executed according to a third event, the visual content may be output while the entire display 110 is exposed to the outside through the upper end of the housing 10, as illustrated in FIG. 7A. In this case, the visual content may refer to a content including both video and audio.

According to another exemplary embodiment, a part of the screen may be not exposed to the outside of the housing 10 as illustrated in FIG. 7B. For example, a part of the display 110 may be not exposed to the outside of the housing 10 so as not to show the black screen area (or the content non-display area) determined by the ratio of the output visual content. By way of example, when the visual content is an image with the aspect ratio of 21:9, the display 110 may protrude from the housing 10 such that the aspect ratio of the display 110 becomes the ratio 21:9, thereby providing the content without the black screen area.

Figure 8:
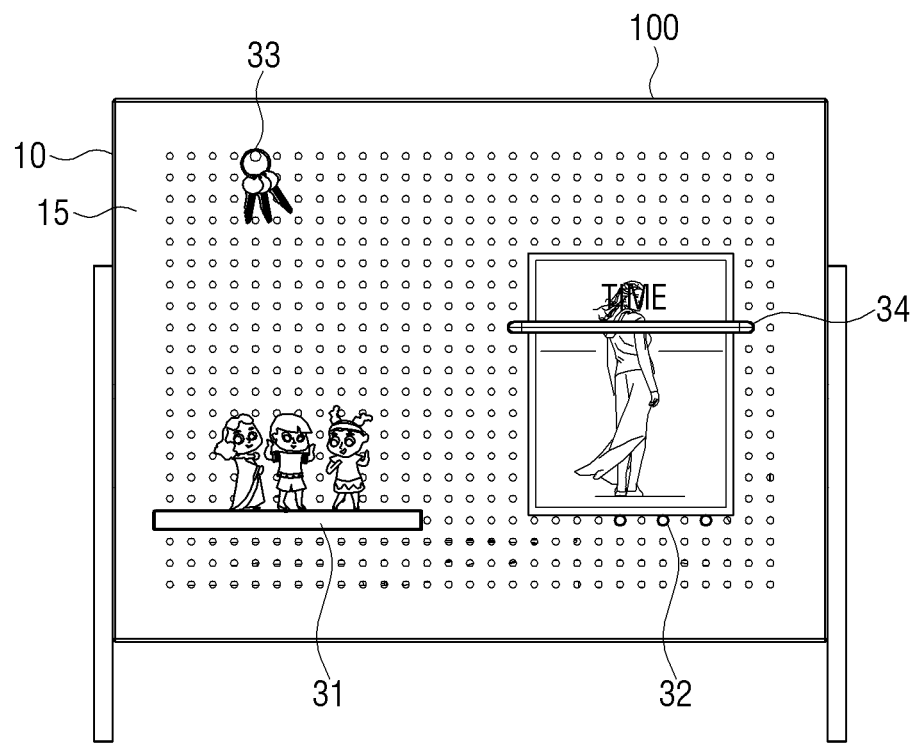
FIG. 8 is a diagram provided to describe a furniture function, according to an exemplary embodiment.

FIG. 8 is a diagram provided to describe a furniture function, according to an exemplary embodiment.

As illustrated in FIG. 8, the audio-visual device 100 may be used as the furniture providing a simple storage function by means of the accessories 31, 32, 33, 34 attached to the front surface 15 of the housing 10.

For example, as illustrated, the plurality of holes 15a on the front surface 15 of the housing 10 may be formed so as to fix the accessories 31, 32, 33, 34. In this case, the accessories 31, 32, 33, 34 may have various shapes suitable to be fixed to the holes, for example, a flat panel shape, a rod shape, a rough bracket shape, or the like. The accessories 31, 32, 33, 34 may store a variety of items.

FIG. 9 is a flowchart provided to describe a method for controlling an audio-visual system, according to an exemplary embodiment.

Referring to FIG. 9, there is provided a method for controlling an audio-visual system including a housing configured to include an open upper end and a storage space inside the housing, an audio-visual device configured to be installed inside the housing and exposable through the upper end of the housing, and a lifting device configured to expose the audio-visual device or store the audio-visual device inside the housing through the upper end of the housing. According to the method, in response to an event occurring in the audio-visual device being a first event (S910:Y), the audio-visual device operates in a first mode for outputting a media art content while the display of the audio-visual device is stored in the housing (S920).

In response to the event occurring in the audio-visual device being a second event (S930:Y), the audio-visual device operates in a second mode for outputting an audio content through a speaker of the audio-visual device while a part of the display is exposed to an outside through the upper end of the housing (S940).

In response to the event occurring in the audio-visual device being a third event (S950:Y), the audio-visual device operates in a third mode for outputting a visual content while all of an appropriate portion (based on the visual content) of the display is exposed to the outside through the upper end of the housing (S960).

In this case, the lifting device may include a lifting unit configured to be installed on a lower part of the display so as to make the display project through the upper end of the housing and a driving unit configured to drive the lifting unit. In this case, in response to the mode being determined according to an event, the audio-visual device may control the driving status of the driving unit such that the display projects or is stored in a state corresponding to the determined mode.

Further, in response to a mode being determined according to an event, the method may further include performing local dimming to at least a part of a screen area of the display based on a size of a content output in the determined mode.

In response to a mode being determined according to an event, the method may further include automatically communicating with a source device providing content which is outputtable in the determined mode.

In response to a mode being determined according to an event, the method may further include activating at least one speaker corresponding to sound output in the determined mode and performing equalization for the sound.

The method may further include providing a UI where information related to the audio content is reconstructed based on a size of the part of the display exposed in the second mode, through the exposed part of the display.

Further, according to an exemplary embodiment, the housing includes a front surface where a plurality of holes are formed with a predetermined distance therebetween. In this case, the method may further include sensing an accessory attached by means of the plurality of holes and displaying the media art content in a display area corresponding to a position where the accessory is not attached, based on a sensing result of the sensor, in the first mode.

According to the above-described various exemplary embodiments, the audio-visual system may provide a user with an image-viewing/sound-listening environment according to respective modes optimized for diverse content types, thereby enhancing user convenience. Further, the audio-visual system may function as storage furniture contributing to the home interior decoration, thereby satisfying user's aesthetic needs.

The methods according to the above-described various exemplary embodiments may be implemented simply by upgrading the software or hardware of the conventional audio-visual devices.

In addition, the above-described various exemplary embodiments may be realized through an embedded server in the audio-visual device or an external server outside the audio-visual device.

The inventive concept may also be embodied as a non-transitory computer readable medium including a program that is executed by a processor or a computer for sequentially executing operations of the above-described method may be provided.

The non-transitory computer readable medium refers to a medium that stores data permanently or semi-permanently unlike a register, a cache, or a memory that stores data for a short time, and is readable by a device. Particularly, the above-described various applications and programs may be stored in and provided through the non-transitory computer readable medium, such as, a Compact Disc (CD), a Digital Versatile Disk (DVD), a hard disk, a Blu-ray disk, a USB, a memory card, a ROM, or the like.

As provided above, a few exemplary embodiments have been shown and described. The foregoing exemplary embodiments and advantages are merely exemplary and are not to be construed as limiting the present disclosure. The present teaching can be readily applied to other types of devices. Also, the description of the exemplary embodiments is intended to be illustrative, and not to limit the scope of the claims, and many alternatives, modifications, and variations will be apparent to a person having ordinary skill in the art.

What is claimed is:

1. An audio-visual device comprising:
a speaker;
a housing comprising an upper end portion having an opening and a storage space inside the housing;
a stand configured to support the housing such that the housing is spaced apart from a floor surface;
a display configured to be stored in the storage space inside the housing and to be moved through the opening of the upper end portion of the housing, the display having a display area for displaying contents;
an actuator configured to move the display into and out of the housing through the opening of the upper end portion of the housing; and
a processor configured to:
control the actuator to move the display out of the housing through the opening of the upper end portion of the housing such that a portion of the display area of the display is disposed outside the housing, while the portion of the display area of the display is disposed outside the housing through the opening of the upper end portion of the housing, control the speaker to playback an audio content, and control the display to display information relating to the audio content by operating the portion of the display area of the display,
control the actuator to move the display out of the housing through the opening of the upper end portion of the housing such that an entirety of the display area of the display is disposed outside the housing, and
while the entirety of the display area of the display is disposed outside the housing, control the display to display a video content by operating the entirety of the display area of the display.

2. The audio-visual device of claim 1, further comprising a remote control device,
wherein the information relating to the audio content is a user interface for controlling output of the audio content via the remote control device.

3. The audio-visual device of claim 1, wherein the processor is configured to receive the audio content or the information relating to the audio content from an external source.

4. An audio-visual device comprising:
a housing comprising an open upper end and a storage space inside the housing;
one or more speakers included in the housing;
a display configured to be stored inside the housing and exposable through the open upper end of the housing; and
an actuator configured to:
move the display out of the housing through the open upper end of the housing such that the display is exposed through the open upper end of the housing in a vertically standing position and move the display into the housing through the open upper end;
a processor configured to:
control the actuator to store the display in the housing,
control the actuator to expose a partial area of the display through the open upper end of the housing in the vertically standing position
while a partial area of the display is maintained in the vertically standing position, control the one or more speakers to output audio associated with an audio content and control the display to display information relating to the audio content by operating the exposed partial area of the display,
control the actuator to expose an entire area of the display through the open upper end of the housing in the vertically standing position, and
while the entire area of the display is maintained in the vertically standing position, control the display to display the video of the visual content by operating the entire area of the display and control the one or more speakers to output audio associated with the visual content.

5. The audio-visual device of claim 4, wherein the processor is configured to receive the audio content or the information related to the audio content from an external source.

6. The audio-visual device as claimed in claim 1, wherein the storage space comprises space for accommodating the speaker inside the housing while the entirety of the display area of the display is disposed inside the housing.

7. The audio-visual device as claimed in claim 4, wherein the storage space comprises space for accommodating the one or more speakers inside the housing while the entire area of the display is disposed inside the housing.

* * * * *